US010365580B2

(12) United States Patent
Kawamura et al.

(10) Patent No.: US 10,365,580 B2
(45) Date of Patent: Jul. 30, 2019

(54) DEVELOPING MEMBER, ELECTROPHOTOGRAPHIC PROCESS CARTRIDGE, AND ELECTROPHOTOGRAPHIC IMAGE FORMING APPARATUS

(71) Applicant: CANON KABUSHIKI KAISHA, Tokyo (JP)

(72) Inventors: Kunimasa Kawamura, Mishima (JP); Makoto Souma, Yokohama (JP); Wataru Moriai, Suntou (JP)

(73) Assignee: Canon Kabushiki Kaisha, Tokyo (JP)

(*) Notice: Subject to any disclaimer, the term of this patent is extended or adjusted under 35 U.S.C. 154(b) by 98 days.

(21) Appl. No.: 15/482,457

(22) Filed: Apr. 7, 2017

(65) Prior Publication Data

US 2017/0293238 A1 Oct. 12, 2017

(30) Foreign Application Priority Data

Apr. 12, 2016 (JP) ................................. 2016-079696

(51) Int. Cl.
*B32B 9/04* (2006.01)
*G03G 15/08* (2006.01)

(52) U.S. Cl.
CPC ..... *G03G 15/0808* (2013.01); *G03G 15/0818* (2013.01)

(58) Field of Classification Search
CPC ....................... G03G 15/0808; G03G 15/0818
(Continued)

(56) References Cited

U.S. PATENT DOCUMENTS 6,004,669 A * 12/1999 Rokutan ................. B32B 15/06 428/335
8,600,273 B2 12/2013 Yamada
(Continued)

FOREIGN PATENT DOCUMENTS

JP 57-5047 A 1/1982
JP 2012150453 A 8/2012
JP 2012237889 A 12/2012

*Primary Examiner* — Thao T Tran
(74) *Attorney, Agent, or Firm* — Canon U.S.A.Inc., IP Division

(57) ABSTRACT

A developing member includes a substrate, an elastic layer, and a surface layer in that order. The surface layer contains a urethane resin and a filler. The urethane resin has: the structure represented by structural formula (1) and at least one of the structures represented by structural formula (2) and structural formula (3), between two adjacent urethane linkages; and the structure represented by structural formula (4) and the structure represented by structural formula (5), between two adjacent urethane linkages. The structural formulas (1) to (5) are as follows:

(1)

$$—CH_2—CH_2—CH_2—CH_2—O—$$

(2)

(3)

(4)

(Continued)

-continued (5)

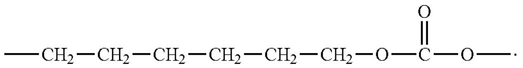

8 Claims, 5 Drawing Sheets

(58) Field of Classification Search
USPC .............................................. 399/286; 528/85
See application file for complete search history.

(56) References Cited

U.S. PATENT DOCUMENTS

| | | | | |
|---|---|---|---|---|
| 8,660,472 | B2 | 2/2014 | Kurachi | |
| 2014/0126935 | A1* | 5/2014 | Tagawa .............. | G03G 15/0818 399/286 |

* cited by examiner

DEVELOPING MEMBER, ELECTROPHOTOGRAPHIC PROCESS CARTRIDGE, AND ELECTROPHOTOGRAPHIC IMAGE FORMING APPARATUS

BACKGROUND OF THE INVENTION

Field of the Invention

The present disclosure relates to a developing member and an electrophotographic process cartridge that are used in an electrophotographic image forming apparatus, and to an electrophotographic image forming apparatus.

Description of the Related Art

The developing member of an electrophotographic image forming apparatus functions to supply a developer to the electrostatic latent image on the electrophotographic photosensitive member. Japanese Patent Laid-Open No. 2012-150453 discloses a developing member including a surface layer containing a urethane resin having a structure containing a side chain methyl group between urethane linkages.

SUMMARY OF THE INVENTION

An aspect of the present disclosure is directed to providing a developing member allowing high-quality electrophotographic images to be formed over a long time. Another aspect of the present disclosure is directed to providing a process cartridge and an electrophotographic image forming apparatus that allow high-quality electrophotographic images to be stably formed under various conditions.

According to an aspect of the present disclosure, there is provided a developing member including a substrate, an elastic layer, and a surface layer in that order, wherein, the surface layer contains a urethane resin and a filler, and the urethane resin has: the structure represented by structural formula (1) and at least one of the structures represented by structural formula (2) and structural formula (3) between two adjacent urethane linkages; and the structure represented by structural formula (4) and the structure represented by structural formula (5) between two adjacent urethane linkages:

$$—CH_2—CH_2—CH_2—CH_2—O— \quad (1)$$

(2)

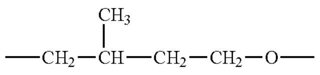

(3)

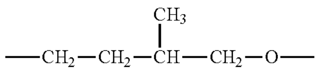

(4)

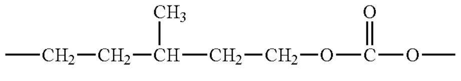

(5)

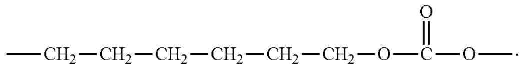

According to another aspect of the present disclosure, there is provided an electrophotographic process cartridge removably mounted in an electrophotographic image forming apparatus, wherein the electrophotographic process cartridge includes the above-described developing member, a developing blade, and a toner container. According to still another aspect of the present disclosure, there is provided an electrophotographic image forming apparatus including a photosensitive member and a developing member disposed so as to charge the photosensitive member, the developing member being the above-described developing member.

Further features will become apparent from the following description of exemplary embodiments with reference to the attached drawings.

DESCRIPTION OF THE EMBODIMENTS

Figure 1A:
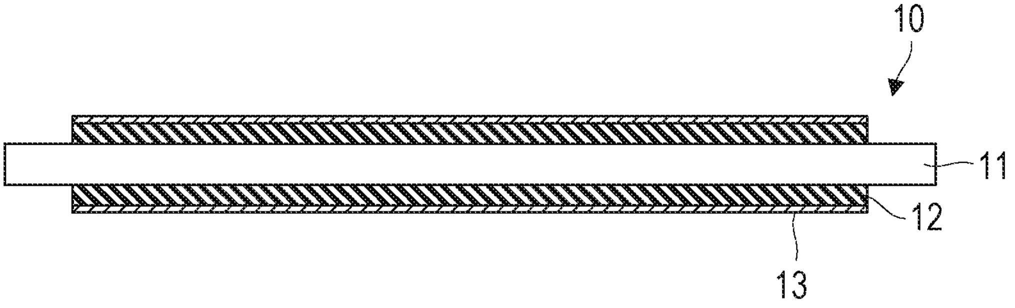
FIG. 1A is a sectional view of an example developing member taken in a direction parallel to the longitudinal direction.

For the developing member including an elastic layer and a surface layer containing a urethane resin and a filler, the present inventors found that the use, in the surface layer, of a urethane resin having a structure formed by copolymerization of a polyether structure having a side chain methyl group with a polycarbonate structure having a side chain methyl group enables stable image formation with high durability over a long time while reducing or eliminating the decrease in the charge quantity of the toner and the separation of the surface layer.

The inventors assume that the reason for this is as follows. The toner on the developing member is charged to a desired charge mainly by friction with the developing blade. Unfortunately, the toner on the developing member receives an electric field generated by a bias voltage applied between the developing member and a member (the developing blade or the photosensitive member) in contact with the developing member, and the charges of the toner on the developing member thus can leak toward the substrate of the developing member. If development on the photosensitive member is performed in a state where the charge quantity of the toner on the developing member is thus reduced, the toner can be developed in a solid white image area on the photosensitive member where the toner image should not be formed, and then transferred to a solid image area on a paper sheet, thus causing what is called "fogging" and resulting in degraded image quality. Accordingly, it is preferable to increase the electric resistance of the surface layer of the developing member to reduce or eliminate the leakage of toner charges so that the toner can have a desired charge quantity when developed on the photosensitive member.

The present inventors found that the electric resistance of the surface layer is increased when a urethane resin having either or both the polycarbonate structure represented by structural formula (4) and the polycarbonate structure represented by structural formula (5) has been added as the binder to the surface layer, and that thus toner charges can be prevented from leaking when the electrostatic latent image is developed.

However, surface layers containing a urethane resin having a polycarbonate structure, such as the structure represented by structural formula (4) or the structure represented by structural formula (5), as the binder tend to have a high hardness. For stably forming high-quality electrophotographic images over a long period of time, it is preferable to minimize the load placed on the toner to reduce the deterioration of the toner. One of the approaches for this is to soften the surface layer of the developing member. However, the surface layer containing a binder to which a polycarbonate structure is introduced between two adjacent urethane linkages tends to have high hardness, as mentioned above.

To solve this issue, the present inventors used, as the binder resin in the surface layer, a urethane resin having either or both the polycarbonate structures represented by structural formula (4) and structural formula (5) between two adjacent urethane linkages, and further having the structure represented by structural formula (1) and either or both the structures represented by structural formula (2) and structural formula (3) between two adjacent urethane linkages. As a result, the inventors found that the use of such a urethane resin can reduce or eliminate the increase in the hardness of the surface layer resulting from the increase in the electric resistance of the surface layer.

$$-CH_2-CH_2-CH_2-CH_2-O- \quad (1)$$

(2)

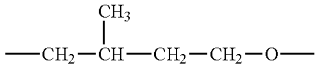

(3)

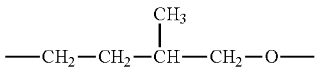

(4)

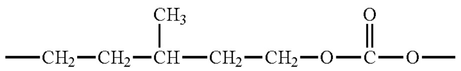

(5)

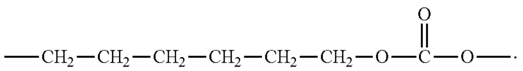

The urethane resin used in an embodiment of the present disclosure has side chain methyl groups in soft segments thereof by introducing at least one of the structures represented by structural formula (2) and structural formula (3) between two adjacent urethane linkages and at least one of the structures represented by structural formula (4) and structural formula (5) between two adjacent urethane linkages. Probably, the side chain methyl groups in the soft segments interact with the filler dispersed in the binder in the surface layer to increase the dispersion of the filler in the urethane resin. Consequently, the surface layer can be reinforced effectively by filler. This is expected to reduce or eliminate the breakage of the surface layer during formation of the electrophotographic images and separation from the elastic layer resulting from the breakage.

Developing Member

Figure 1B:
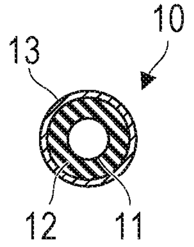
FIG. 1B is a sectional view of the developing member of FIG. 1A taken in a direction perpendicular to the longitudinal direction.

A roller-shaped developing member (hereinafter referred to as the developing roller) will now be described as an embodiment of the present disclosure. However, the developing member of the present disclosure is not limited to the developing roller. The developing member according to an embodiment of the present embodiment is defined by an electrically conductive member including, for example, a solid or a hollow cylindrical substrate 11, an elastic layer 12 fixed around the periphery of the substrate 11, and a surface layer 13 disposed around the periphery of the elastic layer 12, as shown in FIGS. 1A and 1B.

Substrate

The substrate 11 functions as an electrode and a support member of the developing member 10, and is made of a metal or a metal alloy, such as aluminum, a copper alloy, or stainless steel; iron plated with chromium or nickel; or an electrically conductive material, such as an electrically conductive synthetic resin. The substrate may be coated with a primer to increase the adhesion between the mandrel and the elastic layer. The primer may be a silane coupling agent, or a urethane, an acrylic-based, a polyester-based, a polyether-based, or an epoxy-based thermosetting or thermoplastic resin.

Elastic Layer

The elastic layer is intended to impart a hardness and an elasticity to the developing member so that the developing member can be pressed on the photosensitive member with an appropriate nip width and pressure to apply an appropriate amount of the toner to the electrostatic latent image formed on the surface of the photosensitive member.

The material, of the elastic layer may be selected from a variety of rubber materials. Rubbers that can be used in the rubber material include: ethylene-propylene-diene monomer (EPDM) rubber, acrylonitrile-butadiene rubber (NBR), chloroprene rubber (CR), natural rubber (NR), isoprene rubber (IR), styrene-butadiene rubber (SBR), fluorocarbon rubber, silicone rubber, epichlorohydrin rubber, and urethane rubber. These rubbers may be used singly or in combination. Among these, silicone rubber is preferable. Examples of silicone rubber include polydimethylsiloxane, polytrifluoropropylsiloxane, polymethylvinylsiloxane, polyphenylvinylsiloxane, and copolymers of two or more of these siloxanes.

The elastic layer may contain an electrical-conductivity-imparting agent, an electrically non-conductive filler, a catalyst, and other additives. Examples of the electrical-conductivity-imparting agent include fine particles of an electrically conductive metal, such as aluminum or copper, fine particles of electrically conductive metal oxide, such as zinc oxide, tin oxide, or titanium oxide, and carbon blacks. Carbon blacks are relatively readily available and are therefore advantageous. If carbon black is used as the electrical-conductivity-imparting agent, the proportion of carbon black is 3 parts to 80 parts by mass to 100 parts by mass of the rubber material. Examples of the electrically non-conductive filler include silica, quartz powder, titanium oxide, zinc oxide, and calcium carbonate.

The thickness of the elastic layer may be in the range of 0.5 mm to 5.0 mm, such as in the range of 2.0 mm to 4.0 mm.

Surface Layer

The surface layer contains a urethane resin and a filler.

Urethane Resin

The urethane resin has:

the structure represented by structural formula (1) and either or both the structure represented by structural formula (2) and the structure represented by structural formula (3), between two adjacent urethane linkages; and the structure represented by structural formula (4) and the structure represented by structural formula (5), between two adjacent urethane linkages.

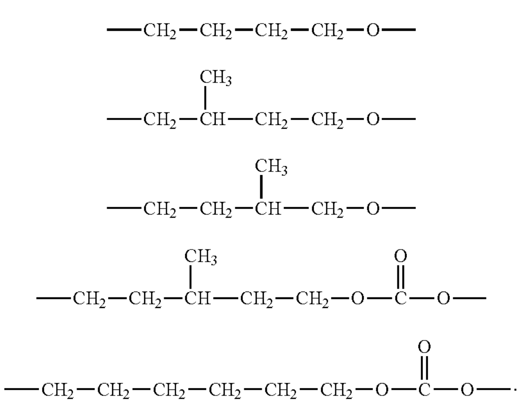

(1) (2) (3) (4) (5)

The urethane resin has a combined structure (hereinafter may be referred to as structure 123) formed of the structure represented by structural formula (1) and either or both the structures represented by structural formula (2) and structural formula (3); a combined structure (hereinafter may be referred to as structure 45) formed of the structure represented by structural formula (4) and the structure represented by structural formula (5).

The two adjacent urethane linkages having structure 123 therebetween may also have structure 45 therebetween, or may be different from the two adjacent urethane linkages having structure 45 therebetween.

Urethane resins having the linear alkylene ether structure represented by structural formula (1) between two adjacent urethane linkages can be soft.

Also, urethane resins having a side chain methyl group between two adjacent urethane linkages, that is, having either or both the structures represented by structural formula (2) and structural formula (3) hinder polymer chain stacking. Consequently, the urethane resin of the present embodiment exhibits low crystallinity at a temperature as low as 15° C., and the softness of the surface layer containing such a urethane resin is unlikely to be reduced even in a low-temperature environment. In other words, the developing member of the present embodiment keeps the toner effectively from deteriorating even in a low-temperature environment and contributes to stable formation of high-quality electrophotographic images.

In the urethane resin, the proportion of the total number of the structures represented by structural formulas (4) and (5) relative to the total number of the structures represented by structural formulas (1), (2), (3), (4) and (5) may be 25% to 75%, and the proportion of the number of the structures represented by structural formula (4) relative to the total number of the structures represented by structural formulas (4) and (5) may be 45% to 95%. When the proportions of the structures are in such ranges, the surface layer exhibits still higher electric resistance and can be more highly reinforced by the filler.

Preferably, the proportion of the total number of the structures represented by structural formula (4) relative to the total number of the structures represented by structural formulas (4) and (5) is 85% to 95%. When the proportion of the number of the polycarbonate structures represented by structural formula (4) is in such a range, the surface layer can be still further reinforced by the filler and can be highly resistant to separation.

In the urethane resin, the ratio of the total number of the structures represented by structural formula (1) to the total number of the structures represented by structural formulas (2) and (3) may be 80:20 to 20:80. When the ratio of the numbers of these polyether structures is in such a range, the surface layer can be still further reinforced by the filler and can be resistant to separation.

It can be checked by, for example, NMR, pyrolysis GC/MS, or FT-IR whether a urethane resin has structure 123 between two adjacent urethane linkages and structure 45 between two adjacent urethane linkages.

The urethane resin can be produced by reacting a polyether diol having structure 123 and a polycarbonate diol having structure 45 with an isocyanate. The polyether diol used herein may be prepared by ring-opening polymerization of tetrahydrofuran with methyltetrahydrofuran. The polycarbonate diol used herein may be prepared by a condensation reaction of 3-methyl-1,5-pentanediol and 1,6-hexanediol with diethyl carbonate.

Examples of the isocyanate include, but are not limited to, aliphatic isocyanates, such as ethylene diisocyanate and 1,6-hexamethylene diisocyanate (HDI); alicyclic isocyanates, such as isophorone diisocyanate (IPDI), cyclohexane 1,3-diisocyanate, and cyclohexane 1,4-diisocyanate; aromatic isocyanates, such as 2,4-tolylene diisocyanate, 2,6-tolylene diisocyanate (TDI), 4,4'-diphenylmethane diisocyanate (MDI), polymeric diphenylmethane diisocyanate, xylylene diisocyanate, and naphthalene diisocyanate; and copolymers, isocyanurates, TMP adducts, biurets, and other blocks of these isocyanates. Aromatic isocyanates, such as tolylene diisocyanate, diphenylmethane diisocyanate, and polymeric diphenylmethane diisocyanate, are more suitable.

The proportion of the isocyanate to be mixed with the polyetherdiols may be in the range of 1.0 mol to 8.0 mol, preferably 1.2 mol to 4.0 mol, relative to 1.0 mol of the hydroxy group of the dials.

The polyether diol and the polycarbonate diol may each have a number average molecular weight in the range of 1000 to 5000, desirably 1000 to 3000. The use of an isocyanate-terminated prepolymer and a hydroxy-terminated prepolymer, prepared by using a polyether diol having a number average molecular weight in the range of 1000 to 3000 facilitates uniform dispersion of the filler, thus enhancing the reinforcing effect of the filler effectively.

The number average molecular weight can be measured under the following conditions with the following instruments:

Measuring device: HLC-8120GPC (manufactured by Tosoh)

Column: TSKgel SuperHZMM (manufactured by Tosoh)×2

Solvent: THF (containing 20 mmol/L of triethylamine)

Temperature: 40° C.

THF flow rate: 0.6 mL/min

For measurement, 0.1% by mass sample solution in tetrahydrofuran (THF) is used. Also, a refractometer, or refractive index (RI) meter, is used as the detector. For creating a calibration curve, TSK standard polystyrenes A-1000, A-2500, A-5000, F-1, F-2, F-4, F-10, F-20, F-40, F-80, and F-128 (each manufactured by Tosoh) are used as standard samples. The number average molecular weight (Mn) is determined from the measured retention time of the sample by using the calibration curve.

The polyether diol and the polycarbonate diol have a low polarity, and are accordingly less compatible with polar isocyanate. Therefore, the reaction system is likely to separate microscopically into a polyol-rich phase and an isocyanate-rich phase. Thus, unreacted components are likely to remain in the polyol-rich phase. Consequently, the surface layer is not sufficiently reinforced. To address this problem, the polyether diol and the polycarbonate diol are used in a form of a hydroxy-terminated prepolymer or an isocyanate-terminated prepolymer to reduce the difference in polarity between the polyol and the isocyanate and increase the compatibility. Thus, the surface layer can be reinforced effectively.

To introduce a polyether structure having structure 123 to the urethane resin of an embodiment of the present disclosure, a hydroxy-terminated prepolymer or an isocyanate-terminated prepolymer prepared by a reaction between a polyether diol having structure 123 and an aromatic isocyanate may be used. The use of a hydroxy-terminated prepolymer or an isocyanate-terminated prepolymer, prepared by a reaction with an aromatic isocyanate leads to a small difference in polarity between the polyol and the isocyanate and an increased compatibility. Thus, the surface layer can be further reinforced effectively.

To introduce a polycarbonate structure having structure 45 to the urethane resin, a hydroxy-terminated prepolymer or an isocyanate-terminated prepolymer, prepared by a reaction of a polycarbonate diol having structure 45 with an aromatic isocyanate may be used.

If the polyether diol and the polycarbonate diol are used in the form of hydroxy-terminated prepolymers prepared by a reaction with an aromatic isocyanate, the number average molecular weight of each prepolymer is desirably in the range of 10000 to 15000. Also, if the polyether diol and the polycarbonate diol are used in the form of isocyanate-terminated prepolymers, the isocyanate content in each of the prepolymers is desirably in the range of 1.0% to 7.0% by mass, such as 3.0% to 4.0% by mass. When the hydroxy-terminated prepolymers have such a number average molecular weight, or when the isocyanate content in the isocyanate-terminated prepolymers is in such a range, unreacted components remaining in the urethane resin can be reduced, and the separation of the surface layer can be reduced or eliminated effectively.

The two adjacent urethane linkages may have a propylene glycol structure or an aliphatic polyester structure therebetween as needed to the extent that the above-described advantageous effects can be produced, in addition to structure 123 and structure 45. Examples of the aliphatic polyester structure include, but are not limited to, diols, such as 1,4-butanediol, 3-methyl-1,5-pentanediol, and neopentyl glycol; and aliphatic polyester polyols produced by condensation of a triol, such as trimethylolpropane, and a dicarboxylic acid, such as adipic acid, glutaric acid, or sebacic acid.

Figure 2:
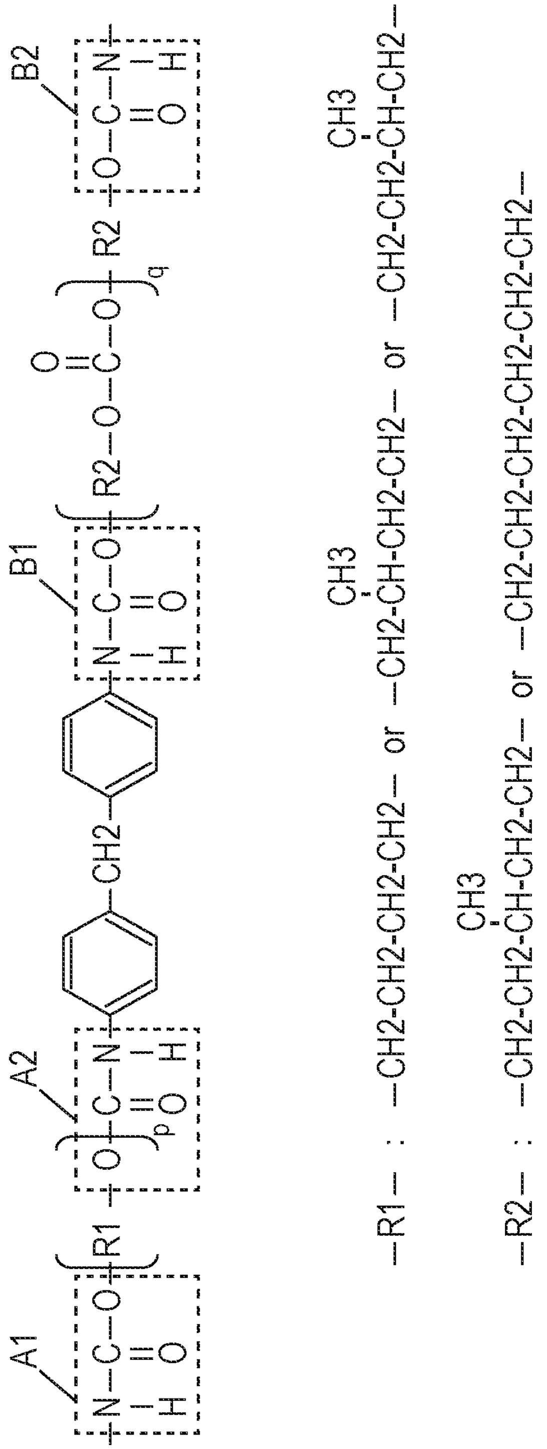
FIG. 2 is an example chemical structure of a urethane resin used in an example embodiment.

FIG. 2 shows a characteristic structure of the urethane resin. In the structure shown in FIG. 2, two adjacent urethane linkages A1 and A2 have the structure represented by structural formula (1) and either or both the structures represented by structural formula (2) and structural formula (3) in random order therebetween. Also, two adjacent urethane linkages B1 and B2 have the structure represented by structural formula (4) and the structure represented by structural formula (5) in random order therebetween.

Such a urethane resin can be soft due to the presence of the polyether component having the structure represented by structural formula (1). Also, the polyether component having either or both the structures represented by structural formula (2) and structural formula (3) hinders the urethane resin from being crystallized particularly at low temperatures, thus imparting a softness to the urethane resin.

Furthermore, the polycarbonate component having the structures represented by structural formula (4) and the structure represented by structural formula (5) increases the electric resistance of the urethane resin, and the polycarbonate component having the structure represented by structural formula (4) hinders the urethane resin from being crystallized at low temperatures, thus imparting a softness to the urethane resin.

In addition, the side chain methyl group of the structure represented by structural formula (2) or structural formula (3) in the polyether component, and the side chain methyl group of the structure represented by structural formula (4) in the polycarbonate component facilitate the intermolecular interaction between the urethane resin and the filler and thus help the filler disperse uniformly in the urethane resin, thus enhancing the reinforcing effect of the filler.

Filler

The filler in the surface layer is intended to reinforce the surface layer. From the viewpoint of controlling the electric resistance of the surface layer and reinforcing the surface layer effectively, both an electrically insulating filler and an electrically conductive filler may be added to the surface layer.

Electrically Insulating Filler

Examples of the electrically insulating filler include quartz fine powder, silica particles, diatomaceous earth, zinc oxide, basic magnesium carbonate, activated calcium carbonate, magnesium silicate, aluminum silicate, titanium dioxide, talc, mica powder, aluminum sulfate, calcium sulfate, barium sulfate, glass fiber, organic reinforcing agents, and organic fillers. The surface of the filler may be hydrophobized with an organosilicon compound, such as polydiorganosiloxane.

Silica particles can be uniformly dispersed in the surface layer and are, accordingly, advantageous as the electrically insulating filler. Silica particles surface-treated by hydrophobization are more advantageous. The side chain methyl groups of the urethane resin in the surface layer have a low polarity. Hydrophobized silica particles are expected to increase the intermolecular interaction between the side chain methyl groups and the silica particles and thus to enhance the reinforcing effect of the filler. The proportion of the silica particles may be in the range of 5% by mass to 20% by mass relative to the mass of the resin component in the surface layer.

In view of the reinforcement of the surface layer and the electrical conductivity thereof, the number average primary particle size of the silica particles is desirably in the range of 10 nm to 120 nm, such as 15 nm to 80 nm or 15 nm to 40 nm. The number average primary particle size can be determined as below. The silica particles are observed under a scanning electron microscope, and 100 particles in the field of view are measured. The measured values are averaged.

For the surface properties of the silica particles, it is advantageous that the silica particles have a hydrophobicity in the range of 40% to 80%, such as 50% to 70%. The hydrophobicity of the silica particles can be measured with a powder wettability tester WET-100P (manufactured by Rhesca) according to the following procedure. Into a 250 mL tall beaker is poured 70 mL of pure water, and 0.03 g of silica particles to be measured are floated on the surface of the water. Methanol is dropped at a rate of 2.6 mL/min with a metering pump while the sample is stirred at 300 rpm, and the transmittance of the resulting sample liquid is measured. The methanol concentration when the transmittance has become the minimum is defined as the measurement value of the hydrophobicity of the sample particles.

The silica particles are made up of fine powder of dry-process silica produced by vapor phase oxidation of a silicon halide or dry-process silica called fumed silica and fine powder of wet-process silica produced from water glass. Desirably, the dry-process silica is such that the particles thereof have few silanol groups therein and at the surfaces and contain few $Na_2O$ or $SO_3^{2-}$ residues produced in the manufacturing process. In a manufacturing process of a dry-process silica, a composite fine powder of silica and another metal oxide can be produced by using a metal halide, such as aluminum chloride or titanium chloride, together with a silicon halide. The silica particles may contain such a composite.

Examples of the agent for hydrophobizing the silica particles include unmodified silicone varnish, a variety of modified silicone varnishes, unmodified silicone oil, a variety of modified silicone oils, silane compounds, silane coupling agents, other organosilicon compounds, and organotitanium compounds. These agents may be used singly or in combination. Silicone oil-treated silica particles are advantageous in terms of uniform dispersed in the surface layer. From the same point of view, it is more advantageous to treat the silica particles with silicone oil simultaneously with or after hydrophobizing the silica particles with a coupling agent.

Electrically Conductive Filler

Examples of the electrically conductive filler include carbon-based materials, such as carbon black and graphite; metals and alloys, such as aluminum, silver, gold, tin-lead alloy, and copper-nickel alloy; metal oxides, such as zinc oxide, titanium oxide, aluminum oxide, tin oxide, antimony oxide, indium oxide, and silver oxide; filler materials plated with a conductive metal, such as copper, nickel, or silver.

Carbon black is advantageous because it is inexpensive and the conductivity thereof is easy to control. From the viewpoint of being uniformly dispersed in the surface layer, a carbon black having a relatively small primary particle size and tending to be hydrophobic is more advantageous. The side chain methyl groups of the urethane resin in the surface layer have a low polarity. Carbon black tending to be hydrophobic is expected to increase the intermolecular interaction between the side chain methyl groups and the carbon black and thus to enhance the reinforcing effect of the filler.

In view of the reinforcement of the surface layer and the electrical conductivity thereof, the number average primary particle size of the carbon black is desirably in the range of 20 nm to 60 nm. Desirably, the surfaces of the carbon black particles have a pH in the range of 3.0 to 8.0. The proportion of the carbon black may be in the range of 5% by mass to 20% by mass relative to the mass of the resin component in the surface layer.

Ionic Conducting Agent

An ionic conducting agent may be added to the surface layer for controlling the electric resistance of the surface layer. The use of an ionic conducting agent allows easy control of the electrical conductivity to a desired level even if the carbon black content is reduced, and softens the surface layer. In an embodiment, both a carbon black and an ionic conducting agent may be added as a conducting agent to the surface layer from the viewpoint of controlling the electric resistance, the reinforcing effect and the softness of the surface layer. The use of both a carbon black and an ionic conducting agent facilitates reducing the decrease in the electric resistance of the developing member caused by applying a high voltage to the developing member, thus reducing or eliminating the decrease in the charge of the toner.

Examples of the ionic conducting agent include salts of Group 1 metals of the periodic table, such as $KCF_3SO_3$, $LiCF_3SO_3$, $LiN(CF_3SO_2)_2$, $NaClO_4$, $LiClO_4$, $LiAsF_6$, $LiBF_4$, NaSCN, KSCN, and NaCl; ammonium salts, such as $NH_4Cl$, $(NH_4)_2SO_4$, and $NH_4NO_3$; salts of Group 2 metals of the periodic table, such as $Ca(ClO_4)_2$ and $Ba(ClO_4)_2$; complexes of any of these salts and a polyhydric alcohol or a derivative thereof, such as 1,4-butanediol, ethylene glycol, polyethylene glycol, propylene glycol, or polypropylene glycol; complexes of any of those salts and a mono-ol, such as ethylene glycol monomethyl ether, ethylene glycol monoethyl ether, polyethylene glycol monomethyl ether, or polyethylene glycol monoethyl ether; cationic surfactants, such as quaternary ammonium salts; anionic surfactants, such as aliphatic sulfonic acid salts, alkyl ether sulfates, and alkyl ether phosphates; and amphoteric surfactants, such as betaine. $KCF_3SO_3$, $LiCF_3SO_3$, and $LiN(CF_3SO_2)_2$ are particularly advantageous. These salts can ensure a uniform and stable electric resistance of the surface layer.

The proportion of the ionic conducting agent may be in the range of 0.1% by mass to 5% by mass relative to the mass of the resin component in the surface layer from the viewpoint of ensuring a uniform and stable electric resistance of the surface layer.

Fine Particles for Controlling Surface Roughness

If a rough surface is preferable for the developing member, the surface layer may contain fine particles for controlling the surface roughness. The fine particles added for controlling the surface roughness may have a volume average particle size of 3 μm to 20 μm. The proportion of such fine particles may be in the range of 1 part by mass to 50 parts by mass relative to 100 parts by mass of the resin component in the surface layer. The fine particles for controlling the surface roughness may be fine particles of polyurethane resin, polyester resin, polyether resin, polyamide resin, acrylic resin, or phenol resin.

The surface layer has a thickness in the range of 1 μm to 50 μm, desirably in the range of 3 μm to 30 μm. The surface layer having a thickness of 1 μm or more, or 3 μm or more, is kept effectively from separating. Also, the surface layer having a thickness of 50 μm or less, or 30 μm or less, can keep the toner from deteriorating and allows stable image formation over a long time.

The thickness of the surface layer can be determined by observing a section of the surface layer taken in the thickness direction under, for example, a digital microscope VEX-600 manufactured by Keyence and measuring the length from the interface between the surface layer and the elastic layer to the top flat surface of the surface layer. This measurement is performed on 5 randomly selected sections, and the arithmetic mean of the 5 measurements is defined as the thickness of the surface layer.

The surface layer may be formed by, but not limited to, spray coating, dip coating, or roll coating. Dip coating performed in such a manner that a paint overflows the top edge of the dipping bath, as disclosed in Japanese Patent Laid-Open No. 57-5047, is simple as the method for forming a surface layer and is advantageous for stably forming the surface layer.

Electrophotographic Process Cartridge and Electrophotographic Image Forming Apparatus The electrophotographic process cartridge is a type that can be removably mounted in an electrophotographic image forming apparatus and includes the above-described developing member, a developing blade, and a toner container. The electrophotographic image forming apparatus includes a photosensitive member and the above-described developing member which is disposed so as to charge the photosensitive member.

Electrophotographic Process Cartridge

Figure 3:
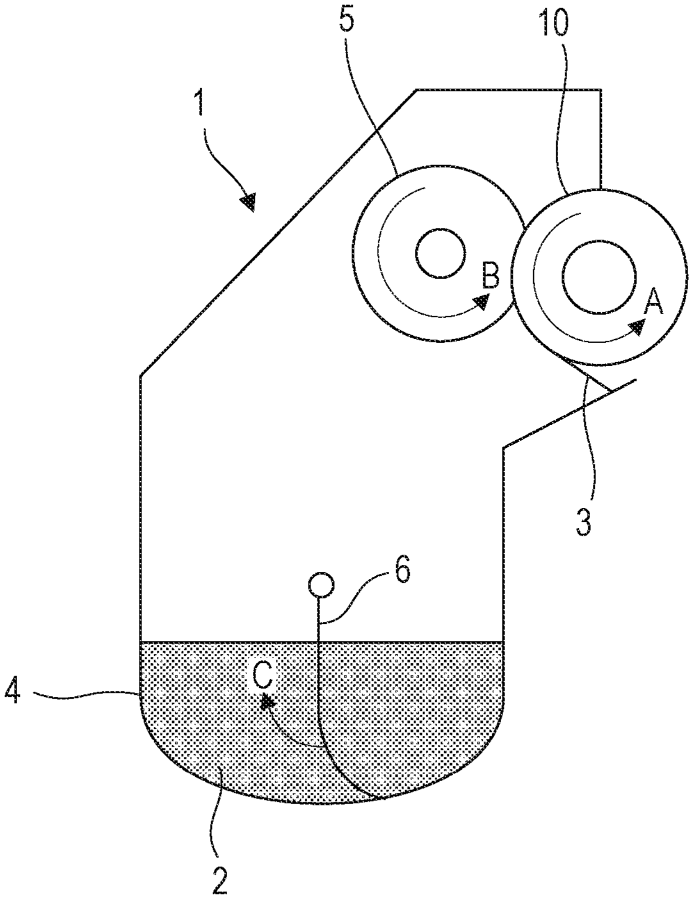
FIG. 3 is a schematic diagram of the structure of an electrophotographic process cartridge according to an example embodiment.

FIG. 3 is a schematic diagram of the structure of an electrophotographic process cartridge according to an embodiment of the present disclosure. A contact developing method using a non-magnetic monocomponent toner may be applied for development.

The electrophotographic process cartridge 1 includes a toner container 4 containing a toner 2, and a developing roller 10 capable of rotating in the direction indicated by arrow A so as to close the opening of the toner container. A toner regulating member 3, i.e. a developing blade, is disposed in contact with the developing roller 10 for triboelectrically charging the toner on the developing roller 10 and forming a thin toner layer while regulating the amount of the toner. To prevent the toner from leaking through both ends of the developing roller 10, the toner container 4 has end sealing members (not shown) in contact with the developing roller 4.

Within the toner container 4, a toner feed roller 5 is disposed in contact with the developing roller 10. The toner feed roller 5 rotates in the direction indicated by arrow B to feed the toner 2 to the developing roller 10 and to scrape the toner 2 remaining on the developing roller 10. A blade-shaped toner stirrer 6 rotates in the direction indicated by arrow C to stir the toner 2 for feeding the toner 2 to the toner feed roller 5.

The toner regulating member 3 is a SUS leaf spring and is in contact with the developing roller 10 in an elastically bent position with a predetermined contact pressure. The toner feed roller 5 is an elastic roller made of an electrically conductive spongy and is disposed in such a manner that the developing roller 10 is pressed into the spongy.

The electrophotographic process cartridge may further include a charging member and a photosensitive drum.

Electrophotographic Image Forming Apparatus

Figure 4:
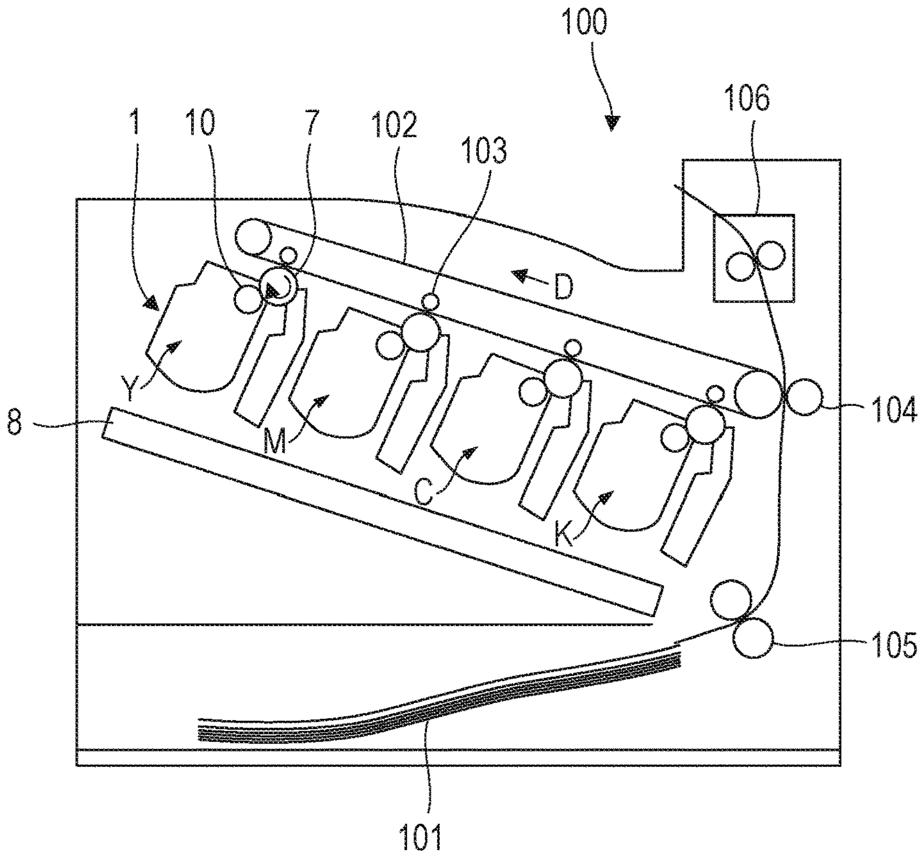
FIG. 4 is a schematic diagram of the structure of an electrophotographic image forming apparatus according to an example embodiment.

FIG. 4 is a schematic diagram of the structure of an electrophotographic image forming apparatus including electrophotographic process cartridges. The electrophotographic image forming apparatus 100 is a color laser printer using a transfer electrophotographic process, a contact charging method, and a monocomponent contact developing method. The electrophotographic image forming apparatus 100 forms full color images on a transfer medium 101 or recording medium, such as a paper sheet or an OHP sheet, according to image information from an external host device (not shown) communicably connected to the image forming apparatus.

Also, the electrophotographic image forming apparatus 100 is a, type using 4 drums arranged in a line for producing full color printed images. More specifically, the electrophotographic image forming apparatus 100 includes a plurality of image forming units that form single-color images of yellow (Y), magenta (M), cyan (C), and black (K). The single-color images formed by each of the image forming units are multiply transferred temporarily to an intermediate transfer belt 102 or intermediate transfer medium and are then transferred together to a transfer medium 101 or recording medium, such as paper. The intermediate transfer belt 102 is stretched between a driving roller and a support roller and is driven in the direction indicated by arrow D by the rollers.

The image forming units have the same structure. Each image forming unit includes a drum-shaped electrophotographic photosensitive member (hereinafter referred to as photosensitive drum) 7 that is an image bearing member capable of holding an electrostatic latent image rotated in the arrow direction. A charging roller (not shown) as a charging device and a laser beam scanner 8 as an exposure device are disposed around the photosensitive drum 7 for forming an electrostatic latent image on the photosensitive drum 7. Furthermore, an electrophotographic process cartridge 1 is disposed as a developing device around each photosensitive drum 7. The electrophotographic process cartridge 1 develops the electrostatic latent image into a visible image (toner image) on the photosensitive drum 7. Also, a cleaner (not shown) is disposed as a cleaning device around the photosensitive drum 7 for removing the toner image remaining on the photosensitive drum 7.

The photosensitive drum 7 is uniformly charged by the charging device (not shown) adapted to charge the image bearing member in the image forming unit, and an electrostatic latent image is formed on the charged surface with the laser beam scanner 8 or exposure device according to signals input from a controller. The electrostatic latent image is developed into a toner image with the toner in the electrophotographic process cartridge 1, thus visualized. This image forming process is performed for each color.

The toner image of each color is transferred onto the intermediate transfer belt 102 at the corresponding primary transfer portion where a primary transfer roller 103 is disposed as a transfer device, and thus, a color image is formed on the intermediate transfer belt 102. The resulting color image is transferred at one time onto a transfer medium 101 at a secondary transfer portion where a secondary transfer roller 104 is disposed as a secondary transfer device. The transfer medium 101 is conveyed from a paper feed cassette to the secondary transfer portion provided with the secondary transfer roller 104 by a conveying roller 105 or conveying device.

The transfer medium 101 on which the color image has been transferred is conveyed to a fixing device 106 in which the toner is fixed, and is then ejected. The toner remaining on the photosensitive drum 7 after transfer is removed by the cleaner (not shown).

The developing member according to an embodiment of the present disclosure can simultaneously reduce both separation of the surface layer thereof and image degradation called "fogging", which is a phenomenon in which the toner is transferred to a solid white image on paper and results from the decrease in the charge quantity of the toner, thus allowing stable image formation with high durability over a long time. Also, the electrophotographic process cartridge and the electrophotographic image forming apparatus, according to a further embodiment of the present disclosure are durable and can stably form images.

EXAMPLES

The subject matter of the present disclosure will be further described with reference to Examples and Comparative Example. The following Examples are some of the best modes of the subject matter, but are not intended to limit the subject matter. Prior to describing Examples, the processes for producing polyether diol, isocyanate-terminated prepolymer, and polycarbonate diol, which are ingredients of the urethane resin, will be described.

Production Example 1: Synthesis of Polyether Diol A-1

The Mixture of 144.2 g of Dry Tetrahydrofuran and 172.2 g of dry 3-methyltetrahydrofuran (mole ratio=50:50) was held at a temperature of 10° C. in a reaction vessel. Tetrahydrofuran is converted into the structure represented by structural formula (1) by ring-opening polymerization, and 3-methyltetrahydrofuran is converted into the structure represented by structural formula (2) and the structure represented by structural formula (3) by ring-opening polymerization. Subsequently, 13.1 g of 70% perchloric acid aqueous solution and 120 g of acetic anhydride were added, and the mixture was subjected to a reaction for 1.5 hours. Then, the resulting mixture was poured into 600 g of 20% sodium hydroxide aqueous solution for purification. Remaining water and solvent were removed under reduced pressure to yield liquid polyether diol A-1. The number average molecular weight of the resulting polyester diol was 1000.

Production Examples 2 and 3: Synthesis of Polyether Diols A-2 and A-3

Polyether diols A-2 and A-3 were synthesized in the same manner as in Production Example 1 except that the reaction time was changed to the time shown in Table 1. The number average molecular weights of the resulting polyester diols were shown in Table 1.

Polyether diols A-1 to A-3 each had the structure represented by structural formula (1) and either or both the structures represented by structural formula. (2) and structural formula (3). Also, the ratio of the number of the structures represented by structural formula (1) to the total number of the structures represented by structural formula (2) and structural formula (3) was 50:50.

TABLE 1

| Polyether diol | Mole ratio of tetrahydrofuran to 3-methyltetrahydrofuran | Reaction time (h) | Mn |
|---|---|---|---|
| A-1 | 50:50 | 1.5 | 1000 |
| A-2 | 50:50 | 2.5 | 2000 |
| A-3 | 50:50 | 4 | 3000 |

Production Example 11: Synthesis of Isocyanate-Terminated Prepolymer B-1

In a nitrogen atmosphere, 200.0 g of polyether diol A-1 was gradually dropped into 76.5 g of polymeric MDI (COSMONATE™ polymeric MDI, produced by Mitsui Chemicals) in the reaction vessel with the temperature therein kept at 65° C. After the completion of dropping, the mixture was subjected to a reaction at 65° C. for 2 hours. The resulting mixture was cooled to room temperature to yield isocyanate-terminated prepolymer B-1 containing 3.8% by mass of isocyanate group.

Production Examples 12 and 13: Synthesis of Isocyanate-Terminated Prepolymers B-2 and B-3

Isocyanate-terminated prepolymers B-2 and B-3 were produced in the same manner as in Production Example 11, except that the polyether diol was replaced as shown in Table 2. The isocyanate group content in each isocyanate-terminated prepolymer is shown in Table 2.

Isocyanate-terminated prepolymers B-1 to B-3 each had the structure represented by structural formula (1) and either or both the structures represented by structural formula (2) and structural formula (3), and the ratio of the moles of the structure represented by structural formula. (1) to the total moles of the structures represented by structural formula (2) and structural formula (3) was 50:50 (in terms of the moles of the ingredients used).

Production Example 14: Synthesis of Isocyanate-Terminated Prepolymer B-4

Isocyanate-terminated prepolymers B-4 was produced in the same manner as in Production Example 11, except that the polyether diol was replaced with polytetramethylene glycol (PTMG 3000, produced by Sanyo Chemical Industries). The ratio of the moles of the structure represented by structural formula. (1) to the total moles of the structures represented by structural formula (2) and structural formula (3) is shown in Table 2 (in terms of the moles of the ingredients used).

Isocyanate-terminated prepolymer B-4 had the structure represented by structural formula (1), but did not have either the structure represented by structural formulas (2) or the structure represented by structural formula (3), and the ratio of the moles of the structure represented by structural formula (1) to the total moles of the structures represented by structural formula (2) and structural formula (3) was 100:0 (in terms of the moles of the ingredients used).

TABLE 2

| Isocyanate-terminated prepolymer | Polyether diol | Isocyanate group content (mass %) | Mole ratio of structures [Structure of (1)]:[Structure of (2) + Structure of (3)] |
|---|---|---|---|
| B-1 | A-1 | 3.8 | 50:50 |
| B-2 | A-2 | 3.9 | 50:50 |
| B-3 | A-3 | 4.0 | 50:50 |
| B-4 | PTMG 3000 | 4.7 | 100:0 |

Production Example 21: Synthesis of Polycarbonate Diol C-1

Into 236.4 g of a mixture of 3-methyl-1,5-pentanediol and 1,6-hexanediol (mole ratio=90:10) was added 224.5 g of diethyl carbonate, followed by heating to 200° C. 3-Methyl-1,5-pentanediol is an ingredient capable of being condensed with diethyl carbonate to form the structure represented by structural formula (4). 1,6-Hexanediol is an ingredient capable of being condensed with diethyl carbonate to form the structure represented by structural formula (5).

After removing ethylene glycol and water, the condensation reaction was resumed in a vacuum to yield polycarbonate diol C-1. The number average molecular weight Mn of the resulting polycarbonate diol. C-1 was 2000.

Production Examples 22 to 28: Synthesis of Polycarbonate Diols C-2 to C-8

Polycarbonate diols C-2 to C-8 were synthesized in the same manner as in Production Example 21 except that the mole ratio of 3-methyl-1,5-pentanediol to 1,6-hexanediol and the reaction time were changed as shown in Table 3. The number average molecular weights Mn of the resulting polycarbonate diols were shown in Table 3.

TABLE 3

| Polycarbonate diol | Mole ratio in mixture [3-methyl-1,5-polycarbonate diol]:[1,6-hexanediol (mole ratio] | Reaction time (h) | Mn | Mole ratio of structures [Structure of (4)]:[Structure of (5)] |
|---|---|---|---|---|
| C-1 | 90:10 | 1.5 | 2000 | 90:10 |
| C-2 | 90:10 | 2.5 | 3000 | 90:10 |
| C-3 | 95:5 | 1.5 | 2000 | 95:5 |
| C-4 | 85:15 | 1.5 | 2000 | 85:15 |
| C-5 | 60:40 | 1.5 | 2000 | 60:40 |
| C-6 | 45:55 | 1.5 | 2000 | 45:55 |
| C-7 | 40:60 | 1.5 | 2000 | 40:60 |
| C-8 | 0:100 | 1.5 | 2000 | 0:100 |

Each of polycarbonate diols C-1 to C-7 has both the structure represented by structural formula (4) and the structure represented by structural formula (5). Polycarbonate diol C-8 has the structure represented by structural formula (5), but does not have the structure represented by structural formula (4). The mole ratio of the structure represented by structural formula (4) to the structure represented by structural formula (5) of each of polycarbonate diols C-1 to C-8 is shown in Table 3 (in terms of the moles of the ingredients used).

Example 1

Developing roller D-1 was produced according to the following procedure.

1. Formation of Substrate

A substrate was prepared by applying a primer (DY35-051, produced by Dow Corning Toray) onto a stainless steel (SUS 304) mandrel of 6 mm in diameter and burning the primer.

2. Formation of Elastic Layer

The substrate was placed in a mold, and the mixture of an addition type silicone rubber and other ingredients shown in Table 4 was injected into the cavity in the mold.

TABLE 4

| Ingredient | Part(s) by mass |
|---|---|
| Liquid silicone rubber material (SE6724A/B, produced by Dow Corning Toray) | 100 |
| Carbon black (TOKABLACK #4300, produced by Tokay Carbon) | 16 |
| Silica powder (agent for imparting heat resistance) | 0.2 |
| Platinum catalyst | 0.1 |

Subsequently, the silicone rubber was cured at 150° C. for 15 minutes by heating the mold. After being removed from the mold, the silicone rubber was further heated to 180° C. for 1 hour for completing the curing. Thus, an elastic roller having a diameter of 12 mm, and having an elastic layer around the substrate, was obtained.

3. Formation of Surface Layer

The ingredients of the surface layer shown in Table 5 were mixed and stirred to yield a surface layer composition.

TABLE 5

| Ingredient | Part(s) by mass |
|---|---|
| Polyol C-1 | 100 |
| Isocyanate terminated prepolymer B-1 | 147 |
| Carbon black MA230 (produced by Mitsubishi Chemical, pH 3.0) | 8 |
| Hydrophobized silica particles MSP-011 (produced by Tayca, silica particles treated with alkylsilane and silicone oil, number average particles size: 30 nm) | 10 |
| Ionic conducting agent $LiN(CF_3SO_2)_2$ (produced by Mitsubishi Materials Electronic Chemicals) | 1 |

Next, the composition was dissolved in methyl ethyl ketone (hereinafter referred to as MEK) to obtain a solids content of 20% by mass, and the ingredients were uniformly dispersed in a sand mill. After 10.0 parts by mass of urethane resin particles (C600, transparent, 10 μm in diameter, produced by Negami Chemical. Industrial) was added to the dispersion, the ingredients were uniformly dispersed to yield a surface layer paint.

Subsequently, the paint was diluted to a viscosity of 5 cps to 7 cps with MEK. Then, the elastic roller was dipped in the diluted paint to coat the elastic layer, followed by drying. The coating was heated at 150° C. for 1 hour to yield an 8 μm thick surface layer over the periphery of the elastic layer. Developing roller D-1 was thus produced.

Examples 2 to 23, Comparative Examples 1 to 6

Developing rollers D-2 to D-29 were produced in the same manner as in Example 1, except that the surface layer composition was replaced with that having the ingredient proportions shown in Table 7-1. The carbon blacks, the silica particles, and the ionic conducting agent, used in the Examples and the Comparative Examples are shown in Table 6.

TABLE 6

| | | |
|---|---|---|
| Carbon black | No. 1 | MA230 (produced by Mitsubishi Chemical, pH 3.0) |
| | No. 2 | MA600 (produced by Mitsubishi Chemical, pH 7.0) |
| Silica particles | No. 1 | Hydrophobized silica particles MSP-011 (produced by Tayca, particles treated with alkylsilane and silicone oil, number average particles size: 30 nm) |
| | No. 2 | Hydrophobized silica particles MSP-012 (produced by Tayca, particles treated with alkylsilane and silicone oil, number average particles size: 16 nm) |
| | No. 3 | Hydrophobized silica particles MSP-009 (produced by Tayca, particles treated with alkylsilane and silicone oil, number average particles size: 80 nm) |
| | No. 4 | Untreated silica particles AEROSIL 50 (produced by Nippon Aerosil, number average particle size: 30 nm) |
| Ionic conducting agent | No. 1 | $LiN(CF_3SO_2)_2$ (produced by Mitsubishi Materials Electronic Chemicals) |
| | No. 2 | $LiCF_3SO_3$ (produced by Mitsubishi Materials Electronic Chemicals) |
| | No. 3 | $KCF_3SO_3$ (produced by Mitsubishi Materials Electronic Chemicals) |

Evaluation of Developing Roller

Developing rollers D-1 to D-29 produced in Examples 1 to 23 and Comparative Examples 1 to 6 were subjected to measurements for evaluation.

1. Analysis of Urethane Resin Structure

The urethane resin in each of the developing rollers D-1 to D-29 was subjected to $^{1}H$ and $^{13}C$ FT-NMR with AVANCE 500 (product name, produced by BRUKER) in deuterated chloroform at 25° C., using tetramethylsilane as the reference material.

As a result, it was confirmed that each of the urethane resins of developing rollers D-1 to D-23 includes: the structure represented by structural formula (1) and either or both the structure represented by structural formula (2) and the structure represented by structural formula (3) between two adjacent urethane linkages; and the structure represented by structural formula (4) and the structure represented by structural formula (5) between two adjacent urethane linkages.

For developing rollers D-24 and D-25, the urethane resins each included: the structure represented by structural formula (1) and either or both the structures represented by structural formula (2) and structural formula (3) between two adjacent urethane linkages; and the structure represented by structural formula (5) without the structure represented by structural formula (4) between two adjacent urethane linkages.

For developing roller D-26 and D-27, the urethane resins each included the structure represented by structural formula (1) without the structure represented by structural formula (2) or the structure represented by structural formula (3) between two adjacent urethane linkages; and the structure represented by structural formula (4) and the structure represented by structural formula (5) between two adjacent urethane linkages.

For developing roller D-28 and D-29, the urethane resins each included the structure represented by structural formula (1) without the structure represented by structural formula (2) or the structure represented by structural formula (3) between two adjacent urethane linkages; and the structure represented by structural formula (5) without the structure represented by structural formula (4) between two adjacent urethane linkages.

Furthermore, the urethane resins of the developing rollers D-1 to D-29 were each subjected to a measurement for determining the proportion of the total number of the structures represented by structural formulas (4) and (5) relative to the total number of the structures represented by structural formulas (1), (2), (3), (4) and (5), and the proportion of the number of the structures represented by structural formula (4) relative to the total number of the structures represented by structural formulas (4) and (5). The results are shown in Tables 7-1 and 7-2.

TABLE 7-1

| | Polyol | | | | Isocyanate-terminated prepolymer | | Carbon black | | Ionic | | Surface layer |
|---|---|---|---|---|---|---|---|---|---|---|---|
| | Component 1 | | Component 2 | | | | | | | | |
| Developing roller | No. | Parts by mass | No. | Parts by mass | No. | Parts by mass | No. | Parts by mass | conducting agent | Silica particles | thickness [μm] |
| D-1 | C-1 | 100.0 | — | — | B-1 | 147.0 | 1 | 8.0 | 1 | 1 | 8 |
| D-2 | C-1 | 100.0 | — | — | B-1 | 147.0 | 1 | 8.0 | 1 | — | 8 |
| D-3 | C-1 | 100.0 | — | — | B-1 | 147.0 | 1 | 10.0 | — | 1 | 8 |
| D-4 | C-1 | 100.0 | — | — | B-1 | 147.0 | 1 | 10.0 | — | — | 8 |
| D-5 | C-3 | 100.0 | — | — | B-1 | 147.0 | 1 | 10.0 | — | — | 8 |
| D-6 | C-4 | 100.0 | — | — | B-1 | 147.0 | 1 | 10.0 | — | — | 8 |
| D-7 | C-5 | 100.0 | — | — | B-1 | 147.0 | 1 | 10.0 | — | — | 8 |
| D-8 | C-6 | 100.0 | — | — | B-1 | 147.0 | 1 | 10.0 | — | — | 8 |
| D-9 | C-2 | 100.0 | — | — | B-1 | 118.0 | 1 | 10.0 | — | — | 8 |
| D-10 | C-2 | 100.0 | — | — | B-1 | 131.0 | 1 | 10.0 | — | — | 8 |
| D-11 | C-1 | 60.0 | A-1 | 40 | B-1 | 147.0 | 1 | 10.0 | — | — | 8 |
| D-12 | C-1 | 50.0 | A-1 | 50 | B-1 | 147.0 | 1 | 10.0 | — | — | 8 |
| D-13 | C-7 | 100.0 | — | — | B-1 | 147.0 | 1 | 10.0 | — | — | 8 |
| D-14 | C-1 | 100.0 | — | — | B-1 | 147.0 | 2 | 10.0 | — | — | 8 |
| D-15 | C-1 | 100.0 | — | — | B-1 | 147.0 | 1 | 8.0 | 2 | — | 8 |
| D-16 | C-1 | 100.0 | — | — | B-1 | 147.0 | 1 | 8.0 | 3 | — | 8 |
| D-17 | C-1 | 100.0 | — | — | B-1 | 147.0 | 1 | 10.0 | — | 2 | 8 |
| D-18 | C-1 | 100.0 | — | — | B-1 | 147.0 | 1 | 10.0 | — | 3 | 8 |
| D-19 | C-1 | 100.0 | — | — | B-1 | 147.0 | 1 | 10.0 | — | 4 | 8 |
| D-20 | C-1 | 100.0 | — | — | B-2 | 147.0 | 1 | 10.0 | — | — | 8 |
| D-21 | C-1 | 100.0 | — | — | B-3 | 147.0 | 1 | 10.0 | — | — | 8 |
| D-22 | C-1 | 100.0 | — | — | B-1 | 147.0 | 1 | 10.0 | — | — | 5 |
| D-23 | C-1 | 100.0 | — | — | B-1 | 147.0 | 1 | 10.0 | — | — | 12 |
| D-24 | C-8 | 100.0 | — | — | B-1 | 147.0 | 1 | 10.0 | — | — | 8 |
| D-25 | C-8 | 100.0 | — | — | B-1 | 147.0 | 1 | 20.0 | — | — | 8 |
| D-26 | C-1 | 100.0 | — | — | B-4 | 147.0 | 1 | 10.0 | — | — | 8 |
| D-27 | C-1 | 100.0 | — | — | | 147.0 | 1 | 20.0 | — | — | 8 |
| D-28 | C-8 | 100.0 | — | — | | 147.0 | 1 | 10.0 | — | — | 8 |
| D-29 | C-8 | 100.0 | — | — | | 147.0 | 1 | 20.0 | — | — | 8 |

TABLE 7-2

| | Presence of structures | | | | Ratio of structures | |
|---|---|---|---|---|---|---|
| | | | | | [Total number of (4) and (5)]/ | [Number of structure of (4)]/ |
| Developing roller | (1) | (2) or (3) | (4) | (5) | [Total number of structures of (1) to (5)] | [Total number of structures of (4) and (5)] |
| D-1 | Yes | Yes | Yes | Yes | 50 | 90 |
| D-2 | Yes | Yes | Yes | Yes | 50 | 90 |
| D-3 | Yes | Yes | Yes | Yes | 50 | 90 |
| D-4 | Yes | Yes | Yes | Yes | 50 | 90 |
| D-5 | Yes | Yes | Yes | Yes | 50 | 95 |

TABLE 7-2-continued

| Developing roller | Presence of structures (1) | (2) or (3) | (4) | (5) | Ratio of structures [Total number of (4) and (5)]/[Total number of structures of (1) to (5)] | [Number of structure of (4)]/[Total number of structures of (4) and (5)] |
|---|---|---|---|---|---|---|
| D-6 | Yes | Yes | Yes | Yes | 50 | 85 |
| D-7 | Yes | Yes | Yes | Yes | 50 | 60 |
| D-8 | Yes | Yes | Yes | Yes | 50 | 45 |
| D-9 | Yes | Yes | Yes | Yes | 80 | 90 |
| D-10 | Yes | Yes | Yes | Yes | 75 | 90 |
| D-11 | Yes | Yes | Yes | Yes | 25 | 90 |
| D-12 | Yes | Yes | Yes | Yes | 20 | 90 |
| D-13 | Yes | Yes | Yes | Yes | 50 | 40 |
| D-14 | Yes | Yes | Yes | Yes | 50 | 90 |
| D-15 | Yes | Yes | Yes | Yes | 50 | 90 |
| D-16 | Yes | Yes | Yes | Yes | 50 | 90 |
| D-17 | Yes | Yes | Yes | Yes | 50 | 90 |
| D-18 | Yes | Yes | Yes | Yes | 50 | 90 |
| D-19 | Yes | Yes | Yes | Yes | 50 | 90 |
| D-20 | Yes | Yes | Yes | Yes | 50 | 90 |
| D-21 | Yes | Yes | Yes | Yes | 50 | 90 |
| D-22 | Yes | Yes | Yes | Yes | 50 | 90 |
| D-23 | Yes | Yes | Yes | Yes | 50 | 90 |
| D-24 | Yes | Yes | No | Yes | 50 | 0 |
| D-25 | Yes | Yes | No | Yes | 50 | 0 |
| D-26 | Yes | No | Yes | Yes | 50 | 90 |
| D-27 | Yes | No | Yes | Yes | 50 | 90 |
| D-28 | Yes | No | No | Yes | 50 | 0 |
| D-29 | Yes | No | No | Yes | 50 | 0 |

2. Measurement of Roller Current

Figure 5:
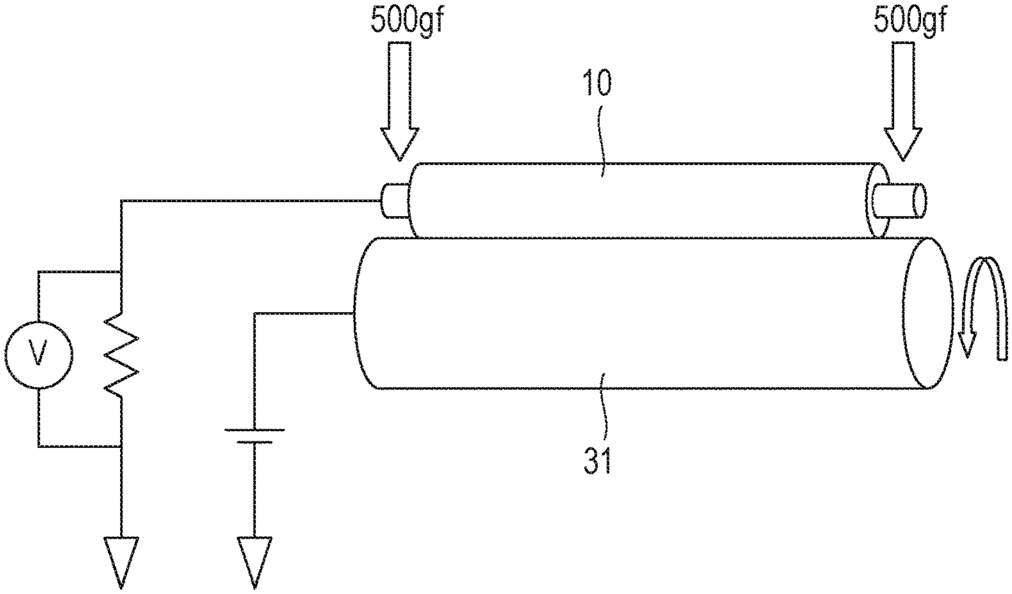
FIG. 5 is a schematic diagram of a system for measuring the current of a developing member.

The current of each developing roller was measured with the system shown in FIG. 5 according to the following procedure. The developing roller 10 is pressed on a SUS drum 31 of 30 mm in diameter by pressing both ends of the substrate with a pressing device (not shown), consequently being driven by the rotation of the drum 31. The pressure on each end was 500 gf (1000 gf in total). The voltage on a standard resister (1 kΩ) connected to the drum 31 in series was measured by applying a direct current (100 V) to the substrate from an external power source while the drum 31 is rotated at 30 rpm. The current of the developing roller 10 can be calculated from the electric resistance of the standard resistor and the voltage applied to the standard resistor. The measurement environment is set at a temperature of 20° C.±3° C. and a relative humidity of 60%±10%.

3. Q/M Measurement

Figure 6:
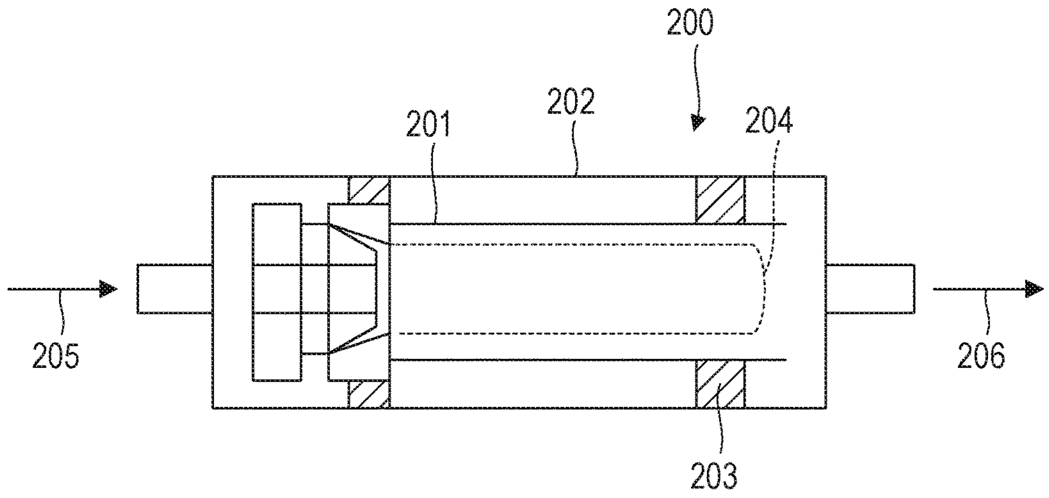
FIG. 6 is a schematic diagram of a Faraday cage for measuring the charge quantity of the toner.

The charge rate Q/M of the toner was measured with a Faraday cage (Faraday Cage 200, suction type, manufactured by SANKYO PIO-TECH. CO., LTD) shown in FIG. 6, according to the following procedure. The Faraday cage is defined by two coaxial metal tubes: an inner tube 201 and an external tube 202, isolated from each other by an insulating member 203. A state where a metal tube with a charge Q seems to exist is established by electrostatic induction caused by inserting a charged substance with a charge Q into the inner tube 201.

First, a process cartridge is forcibly removed from an electrophotographic image forming apparatus operating for forming a solid white image, and the developing roller was thus stopped. Then, the toner 205 on the toner layer before coming into contact with the photosensitive member through the toner regulating member is taken from the toner layer into a paper filter 204 set within the Faraday cage by air suction 206. The induced charge quantity Q (μC) was measured with an electrometer (DIGITAL ELECTROMETER 616, manufactured by KEITHLEY). The charge rate Q/M (μC/g) of the toner collected by the paper filter in the inner tube was calculated by dividing the charge quantity Q by the mass M (g) of the toner. This measurement was made every time 2000 sheets have been continuously output, and the arithmetic mean of the charge quantities until 10000 sheets is calculated. According to the research by the present inventors, the higher the charge rate Q/M, the smaller the fogging degree; thus, the charge rate Q/M has a high correlation with fogging.

4. Evaluation of Fogging

The degree of fogging by the developing roller was examined with an electrophotographic image forming apparatus (Color LaserJet CP3520, manufactured by Hewlett-Packard) according to the following procedure. The developing roller of the black electrophotographic process cartridge of this electrophotographic image forming apparatus was replaced with any of the developing rollers produced above. At this time, the amount of the toner introduced was controlled to 100 g. The line pressure on the developing roller applied by the toner regulating member was set at 60 gf/cm, which was higher than usual.

The electrophotographic process cartridge thus prepared was mounted in the electrophotographic image forming apparatus, and the apparatus was allowed to stand in an environment at a temperature of 30° C. and a relative humidity of 80% for 24 hours. Then, a black-only image with a print coverage of 0.2% was repeatedly output on a letter-size paper sheet "Business Multipurpose 4200" (manufactured by XEROX). The images were output in an intermittent mode in which the rotation of the electrophotographic photosensitive member was stopped every time one letter-size sheet was output every 5 seconds. A solid white image was output every time 1000 sheets were output. This operation was repeated until 20000 sheets were output, and the degree of fogging was examined as below.

The reflection density $R_1$ of the recording medium before image formation and the reflection density $R_2$ of the recording medium after the solid white image was formed were measured with a reflection densitometer TC-6DS/A (manufactured by Tokyo Denshoku), and the increase in reflection density ($R_2-R_1$) was uses as a measure of the degree of fogging. The reflection density was measured over the entire region of the printed image on the recording medium. For the reflection density before image formation, the arithmetic mean of the measured values was used, and for the reflection density after the output of solid white images, the largest value was used. Then, the arithmetic mean of the values of fogging degree measured until 20000 sheets were output was calculated and evaluated according to the following criteria:

Rank A: Fogging degree was less than 1.0.
Rank B: Fogging degree was from 1.0 to less than 2.0.
Rank C: Fogging degree was from 2.0 to less than 3.0.
Rank D: Fogging degree was 3.0 or more.

The lower the degree of fogging, the better the result. Normally, the toner is not transferred to the transfer medium on which a solid white image has been formed, and the degree of fogging is lower than 3.0. However, if the charge quantity of the toner is lower than that required, the toner is transferred to the photosensitive member even though a solid white image is formed, and is further transferred to the transfer medium, thus increasing the degree of fogging.

5. Measurement of Fracture Strength

The fracture strength of the surface layer can be used as a measure representing the resistance of the surface layer to separation. According to the research by the present inventors, the fracture strength of the surface layer has a high correlation with the reinforcing effect of the filler. A sheet of about 200 μm in thickness was formed with each of the surface layer paints and cut into a specimen having a desired shape. The tensile stress at break of the specimen was measured in accordance with JIS K 6251: 2010 (Rubber, vulcanized or thermoplastics-Determination of tensile stress-strain properties). The tensile stress at break of the surface layer was defined as the fracture strength.

For the measurement, the specimen was shaped into a JIS-3 dumbbell and measured with a tensile tester (Tensilon RTC-1250A, manufactured by Orientec) at a temperature of 20° C.±3° C. and a relative humidity of 60%±10%. The portions of 10 mm from each end of the specimen were secured to chucks with a distance of 80 mm therebetween, and the force placed on the specimen at break was measured with a measurement speed of 100 mm/min. The tensile stress at break per unit area was calculated from the force at break and the area at the point of break. The same test was repeated 5 times, and the arithmetic mean was calculated to yield the fracture strength of the specimen (surface layer).

6. Evaluation of Separation of Surface Layer

It was checked whether or not the surface layer was separated from the elastic layer of the developing roller, and the degree of separation was examined. The results of this examinations are ranked. The degree of separation was examined with an electrophotographic image forming apparatus (Color LaserJet CP3520, manufactured by Hewlett-Packard) in the same manner as in Evaluation 4 according to the following procedure. The developing roller of the black electrophotographic process cartridge of this electrophotographic image forming apparatus was replaced with any of the developing rollers produced above. At this time, the amount of the toner introduced was controlled to 100 g. The line pressure on the developing roller applied by the toner regulating member was set at 100 gf/cm, which was higher than usual.

The electrophotographic process cartridge thus prepared was mounted in the electrophotographic image forming apparatus, and the apparatus was allowed to stand in an environment at a temperature of 30° C. and a relative humidity of 80% for 24 hours. Then, a black-only image (hereinafter referred to as black image) with a print coverage of 0.2% was repeatedly output on 20000 letter-size paper sheets "Business Multipurpose 4200" (manufactured by XEROX). The images were output in an intermittent mode in which the rotation of the electrophotographic photosensitive member was stopped every time the black image was output on one sheet every 5 seconds. Also, a solid white image was output on one sheet every time the black image was output on 1000 sheets.

After the black image was output on 20000 sheets, the electrophotographic process cartridge was removed from the electrophotographic image forming apparatus, and further, the developing roller was removed from the electrophotographic process cartridge. After removing the toner from the developing roller, it was visually checked for a spot of separation of the surface layer from the elastic layer, and the degree of the separation was ranked according to the following criteria:

Rank A: No separation was observed.

Rank B: A spot of separation of less than 0.5 mm in equivalent circular diameter was observed.

Rank C: A spot of separation in the range of 0.5 mm to less than 1 mm in equivalent circular diameter was observed.

Rank D: A spot of separation in the range of 1 mm to less than 3 mm in equivalent circular diameter was observed.

Rank E: A spot of separation of 3 mm or more in equivalent circular diameter was observed.

The separation of the surface layer from the elastic layer is more likely to occur at both ends of the developing roller with which the end sealing members come in contact. No toner layer is formed at either end of the developing roller due to the end sealing members, and the developing roller is rotated in contact with the photosensitive drum with a difference in peripheral speed. Consequently, a large frictional force is placed onto the ends of the developing roller. This is the reason of separation at the ends of the developing roller.

TABLE 8

| | | Evaluation results | | | | |
|---|---|---|---|---|---|---|
| | Developing roller | Roller current [μA] | Q/M [μC/g] | Fogging rank | Fracture strength [MPa] | Separation rank |
| Example 1 | D-1 | 70 | 50 | A | 16 | A |
| Example 2 | D-2 | 80 | 47 | A | 12 | B |
| Example 3 | D-3 | 120 | 40 | B | 17 | A |
| Example 4 | D-4 | 150 | 35 | B | 13 | B |
| Example 5 | D-5 | 140 | 36 | B | 14 | B |
| Example 6 | D-6 | 150 | 35 | B | 13 | B |
| Example 7 | D-7 | 170 | 34 | B | 10 | C |
| Example 8 | D-8 | 180 | 33 | B | 10 | C |
| Example 9 | D-9 | 130 | 38 | B | 8 | D |
| Example 10 | D-10 | 140 | 36 | B | 14 | B |
| Example 11 | D-11 | 200 | 32 | B | 13 | B |
| Example 12 | D-12 | 220 | 29 | C | 10 | C |
| Example 13 | D-13 | 200 | 32 | B | 8 | D |
| Example 14 | D-14 | 140 | 37 | B | 12 | B |
| Example 15 | D-15 | 90 | 45 | A | 12 | B |
| Example 16 | D-16 | 100 | 43 | A | 12 | B |
| Example 17 | D-17 | 120 | 38 | B | 18 | A |
| Example 18 | D-18 | 120 | 37 | B | 16 | A |
| Example 19 | D-19 | 140 | 36 | B | 16 | A |
| Example 20 | D-20 | 170 | 34 | B | 13 | B |
| Example 21 | D-21 | 190 | 32 | B | 13 | B |
| Example 22 | D-22 | 140 | 36 | B | 10 | C |
| Example 23 | D-23 | 160 | 35 | B | 14 | B |

TABLE 8-continued

| | Developing roller | Evaluation results: Roller current [μA] | Q/M [μC/g] | Fogging rank | Fracture strength [MPa] | Separation rank |
|---|---|---|---|---|---|---|
| Comparative Example 1 | D-24 | 220 | 27 | C | 6 | E |
| Comparative Example 2 | D-25 | 720 | 19 | D | 10 | C |
| Comparative Example 3 | D-26 | 230 | 26 | C | 6 | E |
| Comparative Example 4 | D-27 | 780 | 17 | D | 10 | C |
| Comparative Example 5 | D-28 | 250 | 24 | C | 5 | E |
| Comparative Example 6 | D-29 | 850 | 15 | D | 8 | D |

The results of Examples 1 to 23 shown in Table 8 suggest that the developing rollers including a surface layer that covers the periphery of an elastic layer and contains a filler and a urethane resin having a structure formed by copolymerization of a polyether structure having a side chain methyl group with a polycarbonate structure having a side chain methyl group enable stable image formation with high durability over a long time while reducing or eliminating the decrease in the charge quantity of the toner and the separation of the surface layer.

More specifically, Comparative Examples 1 to 6 did not satisfy both resistances to fogging and separation at one time because the urethane resin does not have both the unit including the structure of structural formula (1) and the structure of structural formula (2) or (3) and the unit including the structures of structural formulas (4) and (5).

On the other hand, Examples 1 to 23 exhibited both good resistances to fogging and separation because the urethane resin has both the unit including the structure of structural formula (1) and the structure of structural formula (2) or (3) and the unit including the structures of structural formulas (4) and (5).

Furthermore, Examples 4 to 8 and Examples 10 and 11 exhibited higher resistances to fogging and separation than Examples 9, 12 and 13. This is probably because, in each surface layer of Examples 4 to 8 and Examples 10 and 11, the proportion of the total number of the structures represented by structural formulas (4) and (5) relative to the total number of the structures represented by structural formulas (1) to (5) of the urethane resin was within the range of 25% to 75%, and because the proportion of the number of the structures represented by structural formula (4) relative to the total number of the structures represented by structural formulas (4) and (5) was within the range of 45% to 95%.

Also, the resistance to separation in Examples 4 to 6 was better than in Examples 7 and 8. This is probably because, in the surface layers of Examples 4 to 6, the proportion of the number of the structures represented by structural formula (4) relative to the total number of the structures represented by structural formulas (4) and (5) was within the range of 85% to 95%.

Also, the resistance to fogging in Examples 2, 15, and 16 was better than in Example 4. This is probably because the surface layer contained both the carbon black and an ionic conducting agent as the conducting agent.

Also, the resistance to separation in Example 3 and Examples 17 to 19 was better than in Example 4. This is probably because the surface layers of Examples 3 and 17 to 19 contained silica particles.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-079696 filed Apr. 12, 2016, which is hereby incorporated by reference herein in its entirety.

What is claimed is:

1. A developing member comprising: a substrate, an elastic layer, and a surface layer in that order, the surface layer containing a urethane resin and a filler, the urethane resin having:

the structure represented by structural formula (1) and at least one of the structures represented by structural formula (2) and structural formula (3), between two adjacent urethane linkages; and the structure represented by structural formula (4) and the structure represented by structural formula (5), between two adjacent urethane linkages:

$$-CH_2-CH_2-CH_2-CH_2-O- \quad (1)$$

(2)

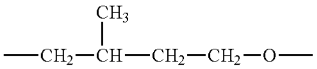

(3)

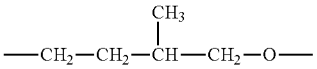

(4)

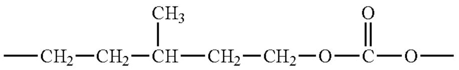

(5)

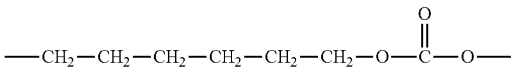

wherein in the urethane resin, the proportion of the total number of the structures represented by structural formula (4) and structural formula (5) relative to the total number of the structures represented by structural formulas (1), (2), (3), (4), and (5) is 25% to 75%, and wherein the proportion of the number of the structures represented by structural formula (4) relative to the total number of the structures represented by structural formula (4) and structural formula (5) is 45% to 95%.

2. The developing member according to claim 1, wherein in the urethane resin, the proportion of the number of the structures represented by structural formula (4) relative to the total number of the structures represented by structural formula (4) and structural formula (5) is 85% to 95%.

3. The developing member according to claim 1, wherein the surface layer further contains a conducting agent including a carbon black and an ionic conductive agent.

4. The developing member according to claim 1, wherein the surface layer further contains silica particles.

5. The developing member according to claim 1, wherein the urethane resin is a reaction product between an isocyanate-terminated prepolymer having structures represented by the structural formula (1) and at least one of the structural formulae (2) and (3), and polycarbonate diol having structures represented by the structural formulae (4) and (5).

6. The developing member according to claim 1, wherein the urethane resin is not an amine modified urethane resin.

7. A process cartridge capable of removably mounted in an electrophotographic image forming apparatus, the process cartridge comprising: a developing member, a developing blade, and a toner container, the developing member including a substrate, an elastic layer, and a surface layer in that order, the surface layer containing a urethane resin and a filler, the urethane resin having:

the structure represented by structural formula (1) and at least one of the structures represented by structural formula (2) and structural formula (3), between two adjacent urethane linkages; and the structure represented by structural formula (4) and the structure represented by structural formula (5), between two adjacent urethane linkages:

$$-CH_2-CH_2-CH_2-CH_2-O- \quad (1)$$

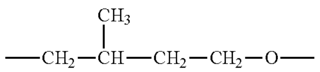

(2)

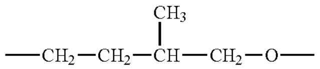

(3)

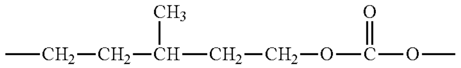

(4)

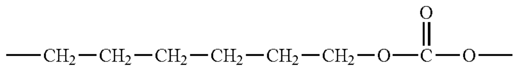

(5)

wherein in the urethane resin, the proportion of the total number of the structures represented by structural formula (4) and structural formula (5) relative to the total number of the structures represented by structural formulas (1), (2), (3), (4), and (5) is 25% to 75%, and wherein the proportion of the number of the structures represented by structural formula (4) relative to the total number of the structures represented by structural formula (4) and structural formula (5) is 45% to 95%.

8. An electrophotographic image forming apparatus comprising: a photosensitive member, and a developing member disposed so as to charge the photosensitive member, the developing member including a substrate, an elastic layer, and a surface layer in that order, the surface layer containing a urethane resin and a filler, the urethane resin having:

the structure represented by structural formula (1) and at least one of the structures represented by structural formula (2) and structural formula (3), between two adjacent urethane linkages; and the structure represented by structural formula (4) and the structure represented by structural formula (5), between two adjacent urethane linkages:

$$-CH_2-CH_2-CH_2-CH_2-O- \quad (1)$$

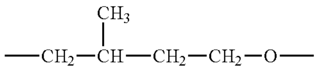

(2)

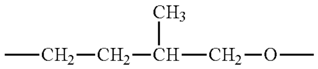

(3)

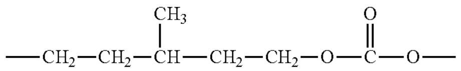

(4)

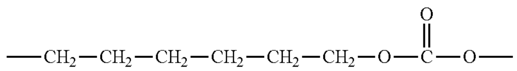

(5)

wherein in the urethane resin, the proportion of the total number of the structures represented by structural formula (4) and structural formula (5) relative to the total number of the structures represented by structural formulas (1), (2), (3), (4), and (5) is 25% to 75%, and wherein the proportion of the number of the structures represented by structural formula (4) relative to the total number of the structures represented by structural formula (4) and structural formula (5) is 45% to 95%.

* * * * *